W. A. HAMMER.
COMBINED GRINDER AND SHAKER.
APPLICATION FILED APR. 25, 1919.

1,327,385.

Patented Jan. 6, 1920.

WITNESSES
F. P. Smith.
Howard D. Orr.

W. A. Hammer, INVENTOR,
BY E. G. Siggers
ATTORNEY ered in position to exclude water and to prevent their removal.
UNITED STATES PATENT OFFICE.

WILLIE A. HAMMER, OF EUFAULA, OKLAHOMA.

COMBINED GRINDER AND SHAKER.

1,327,385.  Specification of Letters Patent.  Patented Jan. 6, 1920.

Application filed April 25, 1919. Serial No. 292,743.

*To all whom it may concern:*

Be it known that I, WILLIE A. HAMMER, a citizen of the United States, residing at Eufaula, in the county of Macintosh and State of Oklahoma, have invented a new and useful Combined Grinder and Shaker, of which the following is a specification.

This invention relates to improvements in combined grinders and shakers for dispensing pepper, spices, or other condiments.

The object is to provide an individual grinder and shaker for table use, wherein there is carried a supply of pepper kernels or other un-ground seeds, kernels or grains which are adapted to be pulverized within the device, by a simple operation of certain parts while holding the shaker in an inverted position and which may then be shaken out in the ordinary manner, thus insuring at all times a supply of condiment having the desired full strength.

Another object is to provide a device of this character having readily detachable parts which may be removed for the purpose of cleansing the same, or for removing accumulated particles when the device may become clogged between the surfaces of co-acting grinding elements, and to provide means for holding and displaying a plurality of pictures upon the sides of the shaker in a manner to preserve the same and to prevent any damage thereto when the device is being cleaned.

A full and complete understanding of the invention may be obtained from a consideration of the following detailed description, taken in connection with the accompanying drawing forming a part of this specification; it being understood that while the latter shows a practical form of the invention, the latter is not confined to strict conformity therewith but may be changed or modified so long as such changes or modifications mark no material departure from the salient features of the invention as specifically pointed out in the appended claim.

In the drawing, wherein similar reference characters designate corresponding parts throughout the several figures:—

Figure 1:
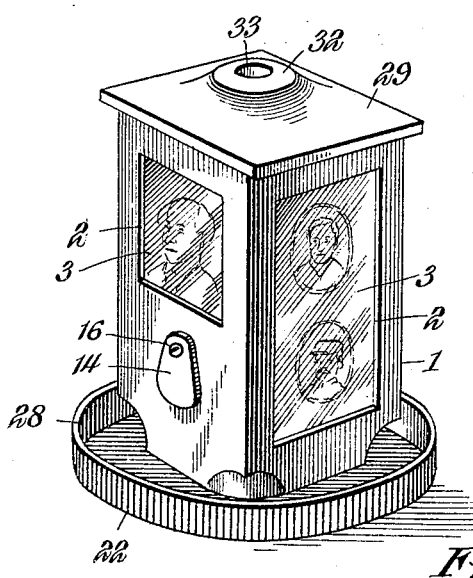
Figure 1 is a perspective view of the improved grinder and shaker in position when resting upon a table or other support.

The invention comprises a rectangular body member 1, preferably square in cross section and formed of glass, porcelain or any other suitable material, the height of the said member being considerably greater than one of the side dimensions.

Upon the side faces thus formed, suitable recesses 2 are provided, wherein are placed any desired portraits or illustrations, or other entertaining or instructive matter, which is shielded from damage while the device is being handled or washed, by suitable transparent plates 3 of glass or other material, suitably cemented in position to exclude water and to prevent their removal.

The body member 1 is provided with a central, longitudinal bore 4 extending throughout its length, having adjacent to one end, constituting normally its lower end, a reduced portion 5 defining inner and outer shoulders 6 and 7 respectively, the inner shoulder 6 being adapted to receive and support a female grinding member 8 in the form of a metallic sleeve seated tightly within the bore and against said shoulder 6 in such manner as to resist accidental dislodgment therefrom suitable cement or other holding means being preferably applied to the parts.

The metallic sleeve 8 is provided with a straight bore or passageway 9 having a series of grinding teeth of any desired form, and said passageway communicates with a tapered portion 10 also having formed therein a series of teeth for co-action with certain parts to be described.

The ends of the metallic sleeve 8 are thus held in spaced relation to the ends of the body member 1 and define chambers 11 and 12 respectively, at the ends of said member 1, the chamber 11 located adjacent to that end of the metallic sleeve 8 having the tapered portion 10 of the passageway, being slightly flared outwardly toward the adjacent end of the body member and constituting a mixing chamber for the ground pepper, spice or other condiment before the same is ejected for use.

The other chamber 12 located at the other end of the body member and within the reduced portion of the bore therein constitutes a holder for the unground pepper, spice, etc., and communication with the same is had through a laterally-disposed supply opening 13 extending to one of the side faces of the body member 1 and normally closed by a pivoted plate 14 adapted to swing into covering relation with the open outer end of the opening 13, and to be held in such position by a lug 15 carried upon the inner face of the said plate, at the end opposite its pivot 16 and adapted to spring into a suitable recess formed in the said face of the body member.

The picture recess 2 formed in that face of the body member having the closure plate 14 pivoted thereto is somewhat shorter than the remaining recesses, thus providing ample space for pivoting the said plate 14.

The outer shoulder 7 formed within the bore or passageway of the body member is located adjacent to the end of the latter, and is adapted to form a seat for one or more circular, metallic plates or disks 17 having each a central passageway 18 through the same of a sufficient size to freely permit the reduced squared portion 19 of a stem or shank 20 to rotate therein, the said stem or shank being provided at its inner end with a toothed conical grinding head 21 located within the tapered portion 10 of the bore in said sleeve 8 and adapted to co-act therewith, when the shank 20 together with the grinding head 21 are revolved in a manner to be described.

A combined base plate and operating member 22 in the form of a metallic disk of a diameter to extend a considerable distance beyond the adjacent sides of the body member 1, is secured to the reduced, squared end 19 of the said shank 20, and is adapted to forcibly turn the latter when rotated, the said plate 22 having a central depressed portion 23 provided with an inwardly projecting boss 24 having a squared opening 25 therethrough to fit the squared portion of the shank 20. The central depression 23 provides the necessary space for a clamping nut 26 which is screwed onto the reduced, threaded terminal 27 of the shank and serves to hold the operating member to the shank, the inner end of the boss 24 bearing against the disks or plates 17 which permits of the free rotation of the shank and the operating member 22.

The member 22 is adapted to act as a base for the device when not in use, as illustrated in Fig. 1 of the drawing, and is provided with an upstanding, peripheral wall or flange 28 which acts to catch any of the contents that may happen to drop from the upper end of the device. The said wall or flange 28 is milled or serrated around its outer face for the purpose of facilitating the turning action of the same to grind the contents of the device and to shake the same while in inverted position, as illustrated in Fig. 2 of the drawing.

Figure 2:
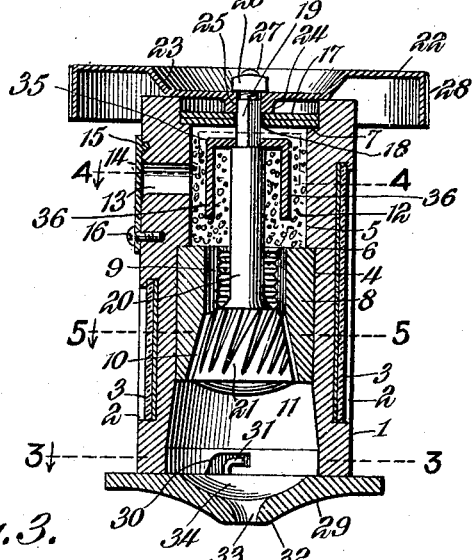
Fig. 2 is a vertical, central sectional view taken longitudinally of the device in inverted position, as when shaking or dispensing condiment therefrom.
Figure 3:
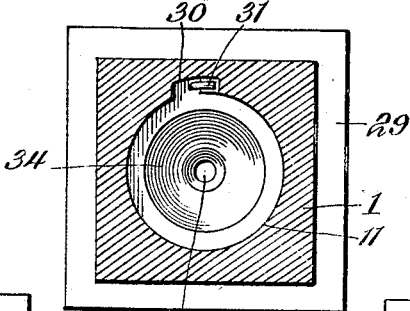
Fig. 3 is a horizontal, transverse sectional view taken on the line 3—3 of Fig. 2 and looking in the direction of the arrow.
Figure 4:
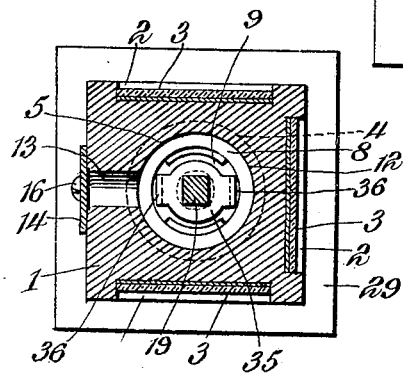
Fig. 4 is a similar view taken on the line 4—4 of Fig. 2.
Figure 5:
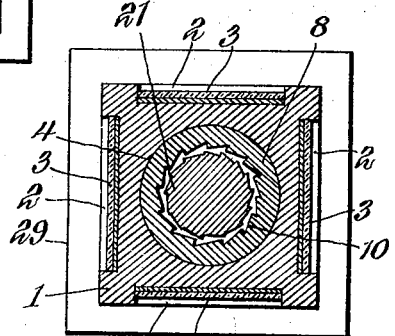
Fig. 5 is a similar view taken on the line 5—5 of Fig. 2.

A cap or closure 29 formed of glass, porcelain or other suitable material and preferably square and of somewhat larger dimensions than the body member 1, is adapted to fit against the end of the body member 1 and to close the open end of the mixing chamber 11, the inner walls of the said body member being provided with bayonet slots 30 for the reception of suitably bent pins or hooks 31 carried by the said cap or closure 29 and serve to hold the same in position, as clearly shown in Figs. 2 and 3 of the drawing. Any other means may be employed to hold the cap in place.

The cap or closure 29 is provided with a raised central portion 32 provided with a reduced central aperture 33 for the egress of the ground contents of the device, the inner face of said cap having a depression 34 communicating with the said aperture and adapted to direct the said ground contents thereto.

In order to prevent any clogging of the unground contents of the device, a stirrer 35 is provided within the chamber 12, said stirrer comprising a central plate having a square aperture to receive the squared portion of the shank 20, and to rest upon the shoulder formed thereby, and a pair of inwardly directed arms 36 extending through the unground contents of the chamber and adapted to stir the same when the shank is turned through the medium of the operating member 22.

From the foregoing it will be seen that a simple device has been provided for holding, grinding and dispensing condiments which will not easily get out of order, which may be readily taken apart for the purpose of cleaning the same, and which may be ornamental and instructive as well as useful by reason of the pictures or other matter displayed upon the side panels of the body member, and which may be advantageously devoted to the display of advertising matter in lieu of the pictures or in conjunction with the same.

What is claimed is:—

An individual condiment grinder and dispenser, comprising a body-member having communicating chambers at each end thereof, grinding mechanism interposed between the chambers and comprising a grinding sleeve rigidly mounted therein and a grinding cone co-acting with the same, said cone having a shank extending beyond one end of the body-member, a combined base plate and operating member connected to the exposed end of the shank to rotate the same, said base plate and operating member being of greater diameter than the body member and having an upstanding annular wall or flange, and a cap plate mounted on the other end of the body-member to close the chamber at that end, said cap having a dispensing orifice and means for securing the said cap in place.

In testimony, that I claim the foregoing as my own, I have hereto affixed my signature in the presence of two witnesses.

WILLIE A. HAMMER.

Witnesses:
T. J. BERNHART,
J. E. REINHARDT.